(12) United States Patent
Farag et al.

(10) Patent No.: US 12,089,268 B2
(45) Date of Patent: Sep. 10, 2024

(54) INFORMATION TRANSMISSION IN RANDOM ACCESS

(71) Applicant: NOKIA TECHNOLOGIES OY, Espoo (FI)

(72) Inventors: Emad Farag, Murray Hill, NJ (US); Nuno Pratas, Gistrup (DK); Frank Frederiksen, Klarup (DK); Chunhai Yao, Beijing (CN)

(73) Assignee: Nokia Technologies Oy, Espoo (FI)

( * ) Notice: Subject to any disclaimer, the term of this patent is extended or adjusted under 35 U.S.C. 154(b) by 79 days.

(21) Appl. No.: 17/593,949

(22) PCT Filed: Mar. 29, 2019

(86) PCT No.: PCT/CN2019/080672
§ 371 (c)(1),
(2) Date: Sep. 28, 2021

(87) PCT Pub. No.: WO2020/199042
PCT Pub. Date: Oct. 8, 2020

(65) Prior Publication Data
US 2022/0159745 A1  May 19, 2022

(51) Int. Cl.
*H04W 74/0833* (2024.01)
*H04L 1/00* (2006.01)
(Continued)

(52) U.S. Cl.
CPC ....... *H04W 74/0841* (2013.01); *H04L 1/0003* (2013.01); *H04W 74/002* (2013.01); *H04W 74/0866* (2013.01)

(58) Field of Classification Search
CPC ... H04L 1/0003; H04L 5/0053; H04L 5/0094; H04L 27/261; H04W 74/002;
(Continued)

(56) References Cited

U.S. PATENT DOCUMENTS 8,874,157 B1 * 10/2014 Shetty ............... H04W 52/42
455/512
2005/0243852 A1 * 11/2005 Bitar ................. H04L 49/608
370/422
(Continued)

FOREIGN PATENT DOCUMENTS

CN 102918896 A 2/2013
CN 104981022 A 10/2015
(Continued)

OTHER PUBLICATIONS

Examination Report for India Application No. 202147048510, mailed on May 6, 2022, 7 pages.
(Continued)

*Primary Examiner* — Stephen J Clawson
(74) *Attorney, Agent, or Firm* — Brake Hughes Bellermann LLP

(57) ABSTRACT

Example embodiments of the present disclosure relate to information transmission in random access. A method comprises selecting, one of a plurality of random access preambles that is received from a terminal device, the plurality of random access preambles being divided into a plurality of subsets of random access preambles; selecting at least one predefined sequence associated with the selected random access preamble based on a predetermined association between a plurality of predefined sequences and the plurality of subsets of random access preambles and based on a target resource unit to be used for transmission of control information and data information; modulating the control information with one of the at least one predefined sequence, the control information indicating configuration of the data information; and transmitting the selected random access preamble, the modulated control information, and the data
(Continued)

information in a random access message to the network device.

17 Claims, 8 Drawing Sheets

(51) Int. Cl.
  *H04W 74/00*  (2009.01)
  *H04W 74/08*  (2009.01)
(58) Field of Classification Search
  CPC .......... H04W 74/004; H04W 74/0841; H04W 74/0866; Y02W 30/62
  See application file for complete search history.

(56) References Cited

U.S. PATENT DOCUMENTS

| | | | |
|---|---|---|---|
| 2008/0232240 A1* | 9/2008 | Baum | H04W 88/00 370/210 |
| 2010/0255847 A1* | 10/2010 | Lee | H04W 74/004 455/436 |
| 2015/0289292 A1 | 10/2015 | Sun et al. | |
| 2016/0295609 A1 | 10/2016 | Vajapeyam et al. | |
| 2016/0374085 A1* | 12/2016 | Chun | H04W 52/362 |
| 2017/0332403 A1 | 11/2017 | Liu et al. | |
| 2019/0320467 A1* | 10/2019 | Freda | H04L 5/0055 |
| 2020/0235900 A1* | 7/2020 | Yang | H04L 5/10 |

FOREIGN PATENT DOCUMENTS

| | | | |
|---|---|---|---|
| CN | 106507497 A | 3/2017 | |
| CN | 107113261 A | 8/2017 | |
| CN | 107734690 A | 2/2018 | |
| CN | 107889273 A | 4/2018 | |
| CN | 108631978 A | 10/2018 | |
| CN | 108633104 A | 10/2018 | |
| WO | 2018064367 A1 | 4/2018 | |
| WO | 2018160046 A1 | 9/2018 | |
| WO | 2018171643 A1 | 9/2018 | |

OTHER PUBLICATIONS

International Search Report and Written Opinion for International Application No. PCT/CN2019/080672, mailed on Jan. 6, 2020, 6 pages.
3GPP TSG-RAN WG2 Meeting #99, R2-1709258; "Selection of Random Access Preamble in NR"; Agenda item: 10.3.1.4.3; Source: Huawei, HiSilicon; Berlin, Germany; Aug. 21-25, 2017; 3 pages.
3GPP TSG RAN WG1 Meeting #87, R1-1611271; "Random Access Preamble Structure and Signaling"; Source: ZTE Corporation, ZTE Microelectronics; Agenda: 7.1.2.3; Reno, Nevada, US; Nov. 14-18, 2016; 6 pages.
European Search Report for Application No. 19922741.4, mailed on Oct. 17, 2022, 9 pages.
Office Action for Indonesia Application No. P00202108057, mailed on Oct. 27, 2023, 6 pages.
Office Action and Search Report for Chinese Application No. 201980094961.4, mailed on Feb. 21, 2024, 9 pages.
3GPP TSG RAN WG1 Meeting #90, R1-1712808; "Early Data Transmission and SPS"; Agenda Item: 5.2.7.1.3; Source: Qualcomm Incorporated; Prague, Czechia; Aug. 21-25, 2017; 19 pages.
Communication under Rule 71(3) EPC for European Application No. 19922741.4, mailed on Apr. 5, 2024, 51 pages.

* cited by examiner

INFORMATION TRANSMISSION IN RANDOM ACCESS

CROSS-REFERENCE TO RELATED APPLICATIONS

This application is a national stage entry of International Application No. PCT/CN2019/080672, filed Mar. 29, 2019, entitled "INFORMATION TRANSMISSION IN RANDOM ACCESS" which is hereby incorporated by reference in its entirety.

FIELD

Example embodiments of the present disclosure generally relate to the field of telecommunication and in particular, to information transmission in random access.

BACKGROUND

Various wireless cellular communication systems have been implemented and are being implemented. Mobile communication systems have been developed and are being developed to meet the increasing demand for communication services. With the rapid advance of technologies, the mobile communication systems have evolved to the level capable of providing high speed data communication service beyond the early voice-oriented services.

A random access (RA) procedure refers to a procedure for a terminal device to establish or reestablish a connection with a network device such as an Evolved NodeB (eNB). A contention based random access can facilitate the possibility that multiple communication devices may be interested in attempting to access the network device through the RA procedure at the same or similar point in time. Once access has been established and/or confirmed, the network device can assign resources to a particular terminal device in support of the uplink communication with the network device.

SUMMARY

In general, example embodiments of the present disclosure provide a solution for information transmission in random access.

In a first aspect, there is provided a method. The method comprises selecting, at a terminal device, one of a plurality of random access preambles, the plurality of random access preambles being divided into a plurality of subsets of random access preambles; selecting at least one predefined sequence associated with the selected random access preamble based on a predetermined association between a plurality of predefined sequences and the plurality of subsets of random access preambles and based on a target resource unit to be used for transmission of control information and data information; modulating the control information with one of the at least one predefined sequence, the control information indicating configuration of the data information; and transmitting the selected random access preamble, the modulated control information, and the data information in a random access message to the network device, the data information being transmitted using at least the target resource unit.

In a second aspect, there is provided a method. The method comprises detecting, at a network device, one of a plurality of random access preambles that is received from a terminal device, the plurality of preambles being divided into a plurality of subsets of random access preambles; determining at least one predefined sequence associated with the detected random access preamble based on a predetermined association between a plurality of predefined sequences and the plurality of subsets of random access preambles and based on a target resource unit to be used for transmission of control information and data information from the terminal device; detecting the control information on the target resource unit based on the at least one predefined sequence, the control information indicating a configuration of the data information; and detecting, based on the control information, the data information on at least a target resource unit.

In a third aspect, there is provided a device. The device comprises at least one processor; and at least one memory including computer program codes; the at least one memory and the computer program codes are configured to, with the at least one processor, cause the device to select, at a terminal device, one of a plurality of random access preambles, the plurality of random access preambles being divided into a plurality of subsets of random access preambles; select at least one predefined sequence associated with the selected random access preamble based on a predetermined association between a plurality of predefined sequences and the plurality of subsets of random access preambles and based on a target resource unit to be used for transmission of control information and data information; modulate the control information with one of the at least one predefined sequence, the control information indicating configuration of the data information; and transmit the selected random access preamble, the modulated control information, and the data information in a random access message to the network device, the data information being transmitted using at least the target resource unit.

In a fourth aspect, there is provided a device. The device comprises at least one processor; and at least one memory including computer program codes; the at least one memory and the computer program codes are configured to, with the at least one processor, cause the device to detect, at a network device, one of a plurality of random access preambles, the plurality of preambles being divided into a plurality of subsets of random access preambles; determine at least one predefined sequence associated with the detected random access preamble based on a predetermined association between a plurality of predefined sequences and the plurality of subsets of random access preambles and based on a target resource unit to be used for transmission of control information and data information from the terminal device; detect the control information on the target resource unit based on the at least one predefined sequence, the control information indicating a configuration of the data information; and detect, based on the control information, the data information on at least a target resource unit.

In a fifth aspect, there is provided an apparatus. The apparatus comprises means for selecting, at a terminal device, one of a plurality of random access preambles, the plurality of random access preambles being divided into a plurality of subsets of random access preambles; means for selecting at least one predefined sequence associated with the selected random access preamble based on a predetermined association between a plurality of predefined sequences and the plurality of subsets of random access preambles and based on a target resource unit to be used for transmission of control information and data information; means for modulating the control information with one of the at least one predefined sequence, the control information indicating configuration of the data information; and means for transmitting the selected random access preamble, the modulated control information, and the data information in a random access message to the network device, the data information being transmitted using at least the target resource unit.

In a sixth aspect, there is provided an apparatus. The apparatus comprises means for detecting, at a network device, one of a plurality of random access preambles that is received from a terminal device, the plurality of preambles being divided into a plurality of subsets of random access preambles, and a subset of random access preambles being associated with one of a plurality of predefined sequences; means for determining at least one predefined sequence associated with the detected random access preamble based on a predetermined association between a plurality of predefined sequences and the plurality of subsets of random access preambles and based on a target resource unit to be used for transmission of control information and data information from the terminal device; means for detecting the control information on the target resource unit based on the at least one predefined sequence, the control information indicating a configuration of the data information; and means for detecting, based on the control information, the data information on a target resource unit corresponding to the predefined sequence associated with the control information.

In a seventh aspect, there is provided a non-transitory computer readable medium comprising program instructions for causing an apparatus to perform at least the method according to the above first aspect.

In an eighth aspect, there is provided a non-transitory computer readable medium comprising program instructions for causing an apparatus to perform at least the method according to the above second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
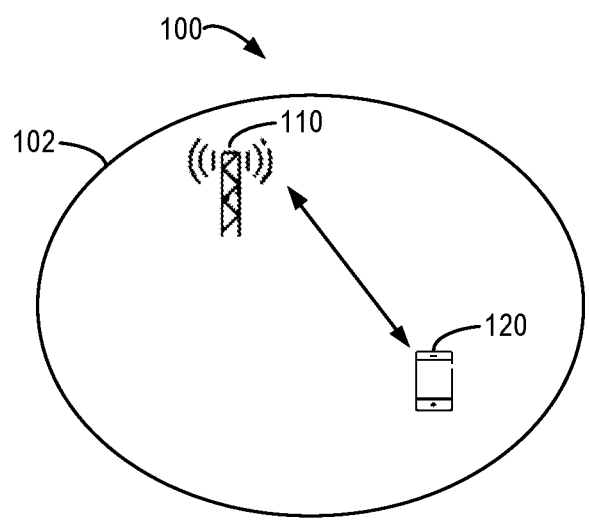
FIG. 1 illustrates an example communication network in which example embodiments of the present disclosure may be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an example embodiment," "an example embodiment," and the like indicate that the example embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates an example communication system 100 in which example embodiments of the present disclosure may be implemented. The system 100 includes a network device 110 and a terminal device 120 served by the network device 110. The serving area of the network device 110 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the network device 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Cyclic Prefix Orthogonal Frequency Division Multiplexing (CP-OFDM), Discrete Fourier Transform spread OFDM (DFT-s-OFDM) and/or any other technologies currently known or to be developed in the future.

In the communication system 100, upon a connection is established, the network device 110 can communicate with the terminal device 120 and the terminal device 120 can also communicate data and control information to the network device 110. A link from the network device 110 to the terminal device 120 is referred to as a downlink (DL), while a link from the terminal device 120 to the network device 110 is referred to as an uplink (UL). In DL, the network device 110 is a transmitting (TX) device (or a transmitter) and the terminal device 120 is a receiving (RX) device (or a receiver). In UL, the terminal device 120 is a TX device (or a transmitter) and the network device 110 is a RX device (or a receiver).

Typically, in order to communicate with the network device 110, the terminal device 120 may initiate a random access (RA) procedure to establish or reestablish a connection with the network device 110.

Figure 2A:
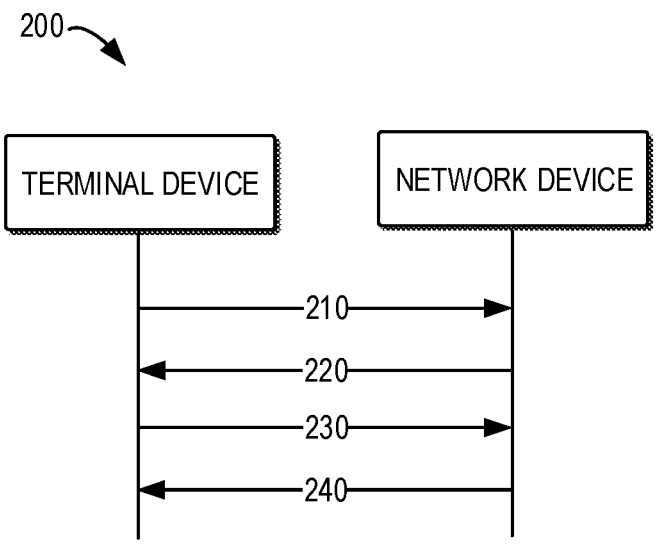
FIG. 2A and FIG. 2B illustrate flowcharts illustrating example random access procedures.

There are a plurality of possible RA procedures that can be employed, such as, a two-step RA, a four-step RA, and etc. The RA procedures may be based on contention among multiple terminal devices. A fourth-step contention-based RA procedure is a typical one, which is briefly introduced below with reference to FIG. 2A. In a RA procedure 200 of FIG. 2A, a terminal device selects and transmits 210 a random access preamble (which may be referred to as "Msg1") to a network device. The network device then transmits 220 a random access response (which may be referred to as "Msg2") to the random access preamble. Upon receipt of the random access response, the terminal device transmits 230 scheduled transmission (which may be referred to as "Msg3") to the network device. The network device transmits 240, depending on contention across its serving tenninal devices, a contention resolution (which may be referred to as "Msg4") to the terminal device.

Figure 2B:
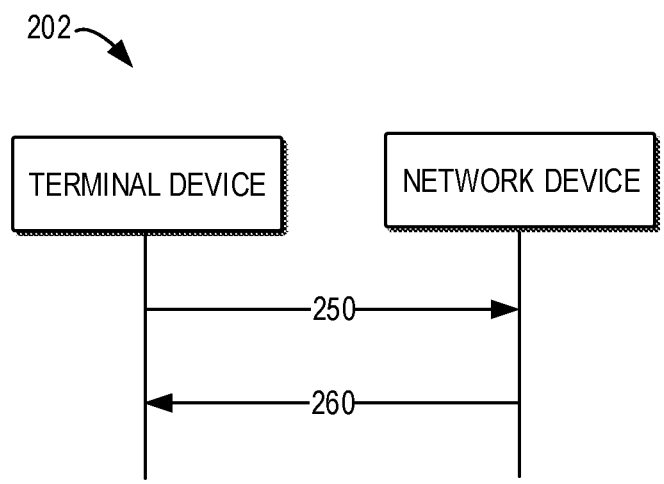

Currently, there is agreed to employ a two-step procedure in order to achieve quick random access. An example of the two-step RA contention-based RA procedure is also briefly introduced below with reference to FIG. 2B. In a RA procedure 202 of FIG. 2B, a terminal device transmits 250 a first message (which may be referred to as "MsgA") to a network device. The first message combines a random access preamble (for example, Msg1) and uplink data (for example, Msg3). In response to the first message, the network device transmits 260 a second message (which may be referred to as "MsgB") to the terminal device. The second message combines a random access response (such as Msg2) and a contention resolution (such as Msg4).

Traditional time alignment procedures require a handshake between the terminal device and the network device are not applicable to some RA procedures such as the two-step RA procedure. For the cases when both preamble and data are comprised in a RA message such as MsgA in the two-step procedure, it has been proposed that the resource for the data part, such as the physical uplink shared channel (PUSCH) occasion may be defined as the time-frequency resource for payload transmission. It has also been proposed that the resource for the data part in that RA message is separately configured from the resource for the RA preamble part (such as the physical random access channel (PRACH) occasion). For one PUSCH occasion, it may be derived based on reusing the resource allocation for the configured grant (such as the NR configured grant) in principle, or alternatively based on other potential configurations such as reusing the semi-static subframe format indication (SFI) and bandwidth part (BWP), reusing occasion of the PRACH, and/or the like. The association between the channel for the data and preamble parts (such as PUSCH and PRACH) for transmission of the RA message has not been proposed.

As an alternative, the relative location of the resource for the data part may be specified or configured with respect to the associated location of the resource for the RA preamble part. For example, the time/frequency relation between RA preambles in PRACH occasion(s) and PUSCH occasions may be a single specification fixed value. As another example, time/frequency relation between each RA preamble in PRACH occasion(s) to the PUSCH occasion may be single specification fixed value. In some examples, different preambles in different PRACH occasions can have different values. As a third example, time/frequency relation between RA preambles in PRACH occasion(s) and PUSCH occasions may be a single semi-statically configured value. In a further example, time/frequency relation between each RA preamble in PRACH occasion(s) to the PUSCH occasion may be a semi-statically configured value; and different preambles in different PRACH occasions can have different values. It is noted that time and frequency relation is not required to be the same alternative. However, there has no proposal to determine the mapping between the RA preamble and the resources for resources for the data part as well as the demodulation reference signal (DMRS). Further, there is no solution regarding how to potentially applying a structure to the actual transmissions when considering larger cells than what is supported within a single cyclic prefix.

In the cases when both preamble and data are comprised in a RA message such as MsgA in the two-step procedure, depending on various applicable triggers of the RA procedure, the payload size of the RA message may be different. The presence and the size of each field of data in the RA message depends on the use case as well as on the available size of the uplink resources carrying the RA message, hence the total size of the RA message could vary depending of the use cases and available resources. For instance, the required minimum size for MsgA may differ for a terminal device in the Radio Resource Control (RRC)-CONNECTED state as compared to terminal device in the RRC IDLE/INACTIVE state.

Furthermore, for the same payload size, it is possible to support different transmission configurations (such as modulation and coding schemes (MCSs) and/or the like) that the terminal can autonomously select for the RA message based on the channel conditions between the terminal device and the network device. Due to the different encoding and/or transmission parameters of a RA message transmitted from the terminal device, such as the different payload sizes, different physical resource blocks (PRBs), and/or different MCSs, it may require the network device to try multiple decode hypothesis to determine the encoding and/or transmission parameters used by the terminal device to transmit the RA message and successfully decode the data included therein. This increases the processing (for example, decoding) complexity at the network device.

An alternative solution is to notify the network device of certain control information regarding the encoding and/or transmission of the data part that is used by the terminal device. There are some possible ways to indicate such information to the network device. For example, the terminal device can use the preamble index to indicate to the network device the configuration used. For example, if there are 4 possible configurations for encoding/transmission of the data part, the preamble space can be divided into 4 sets with the preamble of each set corresponding to one of the four configurations. However, dividing the preambles into groups reduces the pooling efficiency and increases the probability of collisions.

In addition, the reliability of the control information regarding the encoding and/or transmission of the data part impacts performance of the RA message significantly. Therefore, the transmission of the control information is desired to be of high reliability and robustness.

According to some example embodiments of the present disclosure, there is proposed a solution for information transmission in RA. The solution is related to the RA where a RA preamble and data information are transmitted together in a RA message. One example of such RA procedure is a two-step RA procedure. It would be appreciated that any other RA procedures may also be applicable. According to the solution, a plurality of RA preamble available for transmission are divided into a plurality of subsets, each being mapped to one of a plurality of different predefined sequences. Upon selecting one of the RA preambles, a terminal device selects one or more predefined sequences that are associated with the selected RA preamble based at least in part on a predetermined association between the subsets of RA preambles and a plurality of predefined sequences. A selected predefined sequence is used to modulate the control information. The terminal device transmits the selected RA preamble and the modulated control information as well as the data information in a RA message to the network device. In this way, it is possible to improve the reliability of control information.

Figure 3A:
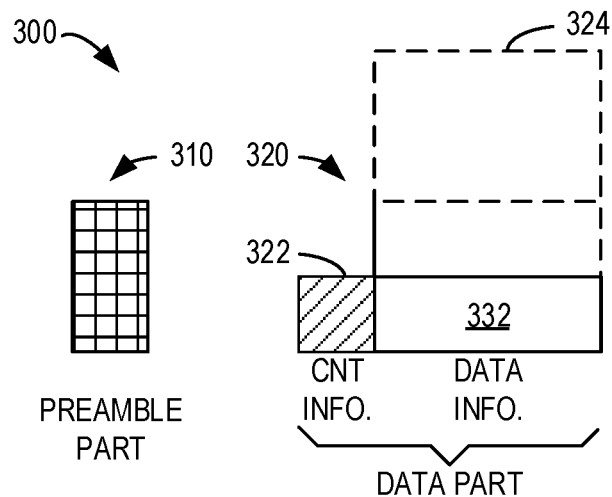
FIG. 3A and FIG. 3B illustrate schematic diagrams of structures of a random access message to be transmitted according to some example embodiments of the present disclosure.
Figure 3B:
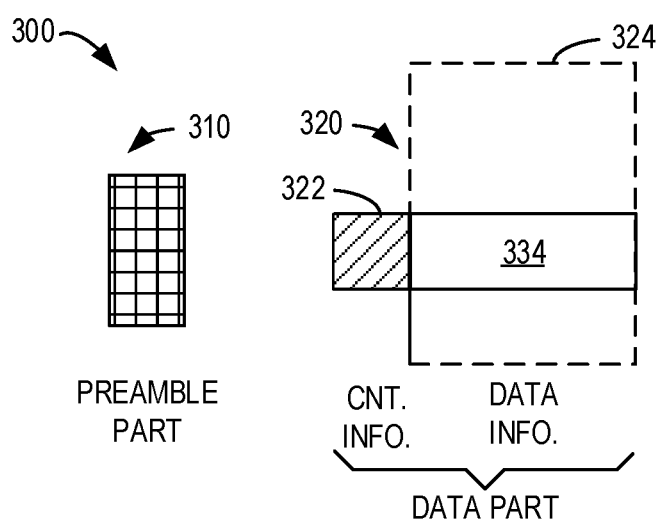

Some example embodiments of the present disclosure will be described in detail below with reference to the accompanying drawings. As briefly discussed above, the RA message to be transmitted to the network device includes a RA preamble, data information, and a predefined sequence indicating control information for the data information. Before discussing example embodiments of transmitting such RA message, some example structures of this RA message are first introduced with reference to FIGS. 3A and 3B. As shown in FIG. 3A, a RA message 300 comprises a preamble part 310 and a data part 320. The preamble part 310 may include a RA preamble selected by the terminal device. The data part 320 is split into two sections, including control resource elements carrying control information 322 and data resource elements carrying data information 324. In some example embodiments of the present disclosure as discussed below, the control information 322 may be associated to a part of the data information 324, such as a part 332 of the data information 324. FIG. 3B shows another example where the control information 322 is illustrated to be associated with a different part 334 of the data information 324.

The control information 322 is used to assist a receiver of the RA message 300 in detecting the data information 324. The data information 324 may include any type of UL data. The type of data and the size of each type of data may depend on the use cases and the triggers for a RA procedure including this RA message 300. For example, the data information 324 may include a unique identity (ID) in order to allow for contention resolution in a response message to the message 300, such as MsgB in a two-step RA procedure. The ID may be different in different cases of the RA procedures. For example, for state transition and/or data transmission in the RRC IDLE/INACTIVE states, the ID may be the RRC message (or part of it) transmitted by the terminal device, which is regarded as "UE Contention Resolution Identity" in, for example, the medium access control (MAC) layer. The ID may be a 48-bit length in a specific example. For data transmission in the RRC CONNECTED state, the ID may be the Cell-Radio Network Temporary Identifier (C-RNTI) MAC control element (CE), which may have a length of 16 bits plus MAC subheader.

In some examples, the data information 324 may include a RRC connection request or a RRC resume request, buffer status report (BSR), and/or a power headroom report (PHR). Alternatively, or in addition, the data information 324 may include data payload, such as the data transmission in the RRC CONNECTED state.

The presence and the size of each type of data information may depend on the use cases and/or on the available size of the resources for carrying the RA message. Therefore, the size of the data information 324 and hence the total size of the RA message 300 may vary depending of the use cases and available resources.

Figure 4:
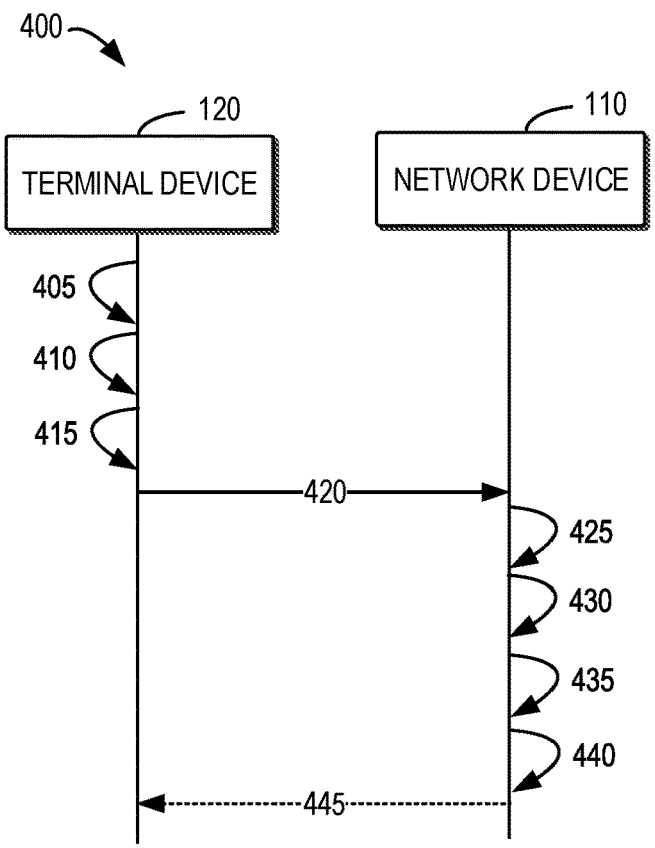
FIG. 4 illustrates a flowchart illustrating a process of information transmission in random access according to some example embodiments of the present disclosure.

Reference is now made to FIG. 4, which shows a process 400 for information transmission in RA according to an example embodiment of the present disclosure. For the purpose of discussion, the process 400 will be described with reference to FIG. 1. The process 400 may involve the terminal device 120 and the network device 110 as illustrated in FIG. 1.

In the process 400, the terminal device 120 selects 405 one of a plurality of RA preambles and selects 410 at least one predefined sequence associated with the selected RA preamble. A predefined sequence is associated with control information to be transmitted in a RA message.

For better understanding, the control information is first introduced. The control information indicates a configuration of data information to be transmitted, which may be used to assist the network device 110 in detecting and decoding the data information. The data information and the control information are to be transmitted in a RA message together with a RA preamble to the network device 110. In some examples, the control information and data information may be mapped to different resource elements (REs) when being transmitted.

In some example embodiments of the present disclosure, the control information may indicate at least one of a size of data information to be transmitted, the number of resource units used for transmitting the data information, or a MCS used for the data information. In some examples, the number of resource units used for transmitting the data information may also indicate the size of the data information and thus the size may be omitted from the control information. The control information may carry one, two, or more bits of information. In some example embodiments, the control information modulates a sequence. For example, the control information modulates a low peak-average power ratio (PAPR) sequence, which may be defined by a cyclic shift of a base sequence. The length of the sequence may be varied and may be extend beyond 12, depending on the number of allocated PRBs. In some examples, the REs assigned to transmission of the control information may be split into two parts, one part carrying an un-modulated sequence as a phase reference, and the other part carrying a sequence modulated by the control information.

In some example embodiments, the control information may be of a predetermined size, for example, may be preconfigured as a fixed size, regardless of the size of the data information that is eventually transmitted. Thus, the resource elements for carrying the control information may also be of a predetermined size. The data information may be of a variable size, which may be changed depending on the use cases and the allocated resources. As mentioned above, in the RA message, the control information and the data information may be collectively referred to as a data part of the RA message as compared to the preamble part. Depending on the size of the data part, different sizes of resources may be needed for transmission of the data information.

In some example embodiments, the size of the data part in the RA message may be in units of "data information resource units," each data information resource unit conveying a certain amount of information (the data information and/or possible the control information). In an example, the size of the data part may include one "data information resource unit." In this case, the "data information resource unit" is corresponding to a part of resource for transmission of the data part of the RA message (such as the data part 320), and the control information may be contained in this part. In another example, the size of the data part may include two "data information resource units," including the one containing the control information and the data information and adjacent one containing data information only. In a further example, the size of the data part may include four "data information resource units," including the one containing the control information and the data information and three adjacent ones containing the data information. Other sizes of the data part are also possible in the RA message.

There may be a plurality of RA preambles available for transmission by the terminal device 120 to the network device 110 in one or more resource units for transmission of a RA preamble. The plurality of RA preambles may be divided into a plurality of subsets of RA preambles, each subset including one or more RA preambles. Each of the subset of RA preambles is mapped to at least one of a plurality of predefined sequences. In some examples, the plurality of RA preambles may be considered as a plurality of sets of RA preambles, each set associated with a resource unit for transmission of data and/or control information.

In some example embodiments, the terminal device 120 may be allowed to perform RA preamble selection from a plurality of RA preamble in each time/frequency resource for RA preamble transmission. The time/frequency resource unit for transmission of a RA preamble may be referred to as a PRACH occasion ("RO" for short). The plurality of RA preamble available in each RO may be the same or different. In some example embodiments, the plurality of RA preambles available in each RO may be divided into a plurality of sets of RA preambles, such as {A1, A2, ..., AN}, where N represents the number of the sets of RA preambles. Each set Ai is associated with a resource unit for transmission of the data information and/or the control information (i.e., a "data information resource unit").

In some example embodiments, the set of RA preambles for each resource unit for the data information may be further divided into one or more subsets of RA preambles. For example, for a set Ai, the subsets of RA preambles may be represented as {Ai1, Ai2, ..., AiM}, where M represents the number of subsets of RA preambles divided from the set Ai. For one or more resource units for data information, all the available RA preambles may be divided and thus the plurality of subsets of RA preambles are generated.

According to example embodiments of the present disclosure, a subset of RA preambles is associated with a predefined sequence(s). In some example embodiments, the plurality of predefined sequences are different and are orthogonal or quasi-orthogonal to each other. For example, a plurality of predefined sequences may be generated as cyclic shifts of a base sequence.

As mentioned above, a portion of all the available RA preambles, such as a set Ai divided from the whole set of available RA preambles, is associated with a resource unit for transmission at least part of the data information. For different subsets of RA preambles divided from the available RA preambles for a resource unit, each is associated with a different predefined sequence. That is, for each resource unit for the data information, each subset of RA preambles may be associated with a unique predefined sequence. In some example embodiments, a subset may include one or more RA preambles. If there is one RA preamble in a subset, there is a one-to-one association between the RA preamble and a predefined sequence for this resource unit. Alternatively, if there is more than one RA preamble in a subset, there is a many-to-one association between RA preambles and the predefined sequences.

Figure 5:
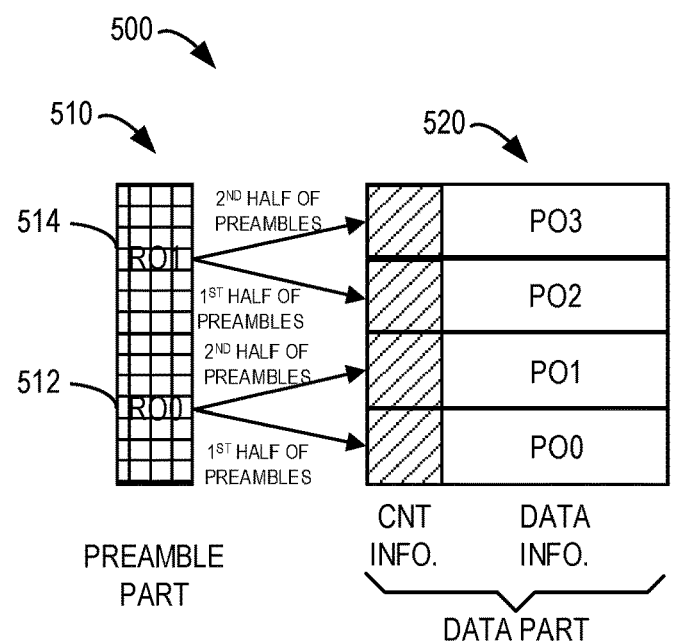
FIG. 5 illustrates a schematic diagram of an example of association between subsets of random access preambles and predefined sequences according to some example embodiments of the present disclosure.

For purpose of illustration, FIG. 5 shows an example of association between the predefined sequence and subsets of RA preambles in a RA message 500. In this example, it is supposed that there are two possible resource units (i.e., ROs) for transmission of the preamble part 510 of the RA message 500, including RO0 512 and RO1 514. In addition there are four possible resource units (sometimes referred to as PUSCH occasions (POs)) for transmission of the data part 520, including PO0, PO1, PO2, and PO3. It is further supposed that there are eight RA preambles available in each RO. In each RO, the first half of RA preambles (the first four RA preambles) are associated with one resource unit (such as PO), and the second half of RA preambles (the last four RA preambles) are associated with another resource unit (such as PO).

For better illustration, the following Table 1 provides an example showing an association between predefined sequences and subsets of RA preambles as well as ROs for the RA preambles and resource units for the data information. This example is to show a one-to-one association between RA preambles and predefined sequence and thus the preamble index is listed. In this example, each RA preamble is associated with a unique predefined sequence in each resource unit for transmission of data information and each resource unit for transmission of a RA preamble. It would be appreciated that in other example, each subset of RA preambles may include more than one RA preamble, and each subset may be associated with more than one predefined sequence in each RO and PO.

TABLE 1

Example association between predefined sequences and subsets of RA preambles as well as ROs for the RA preambles and resource units

| RO | Preamble Index | Resource Unit (PUSCH Occasion) | Predefined Sequence Index |
|---|---|---|---|
| RO0 | 0 | PO0 | 0 |
| RO0 | 1 | PO0 | 1 |
| RO0 | 2 | PO0 | 2 |
| RO0 | 3 | PO0 | 3 |
| RO0 | 4 | PO1 | 0 |
| RO0 | 5 | PO1 | 1 |
| RO0 | 6 | PO1 | 2 |
| RO0 | 7 | PO1 | 3 |
| RO1 | 0 | PO2 | 0 |
| RO1 | 1 | PO2 | 1 |
| RO1 | 2 | PO2 | 2 |
| RO1 | 3 | PO2 | 3 |
| RO1 | 4 | PO3 | 0 |
| RO1 | 5 | PO3 | 1 |
| RO1 | 6 | PO3 | 2 |
| RO1 | 7 | PO3 | 3 |

According to such association, the terminal device 120 may first select a RA preamble and then determine a set of RA preambles from which this RA preamble is selected. The set of RA preambles are available for use in a RO. Based on the set of RA preambles, the terminal device 120 may determine in which target resource unit (for example, PO) the data information and control information are to be transmitted. Then determine a subset of RA preambles from which this RA preamble is selected, based on the predetermined association between subsets of RA preambles and predefined sequences that are specific to the PO, the terminal device 120 may select one or more associated predefined sequences.

As a specific example, if the terminal device 120 selects Preamble 7 in a RO0, the terminal device 120 may determine that in this RO0, the PO to be used for transmission of data and control information is PO1. According to the predetermined association, the terminal device 120 can select Predefined Sequence 3 for use.

It is to be understood that Table 1 is merely an example provided for purpose of illustration. In other example embodiments, different numbers of RA preambles, subsets of RA preambles, resource units for transmitting data information and/or RA preamble, as well as their association may be varied in different examples.

Referring back to FIG. 4, the terminal device 120 modulates 415 the control information associated with one of the selected predefined sequence(s). Depending on the configuration of the data information, the terminal device 120 may determine the control information that indicates such configuration. In some example embodiments, the plurality of predefined sequences may be associated with different control information. The terminal device 120 may then modulate the control information with one of the predefined sequence(s) that is selected.

The following Table 2 shows an example of how the control information indicates the configuration of the data information (in this example, MCS and the size of the data information represented by the number of resource units).

TABLE 2

Example association between control information and configuration of data information

| Control Information | Number of Resource Units | MCS |
| --- | --- | --- |
| 00 | 1 | MCS1 |
| 01 | 1 | MCS2 |
| 10 | 2 | MCS3 |
| 11 | 4 | MCS4 |

In the example of Table 2, different control information may indicate a different configuration combination of the number of resource units and the MCS to be used for the data information. It is to be understood that Table 2 is merely an example. In other examples, control information may be used to indicate more, less, or other different configurations that may be used by the terminal device 120. Thus, the number of bits in the control information may be less than two bits or more than two bits. Further, in addition to the number of resource units and MCS, other parameters related to processing and/or transmission of the data information and assisting the network device 110 in detecting the data information may also be included and indicated using the control information. The scope of the present disclosure is not limited in this regard.

Figure 6:
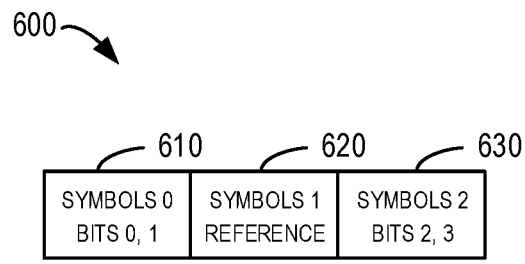
FIG. 6 illustrates a schematic diagram of a structure for conveying control information according to some example embodiments of the present disclosure.

In some example embodiments, to transmit control information containing a large number of bits, such as more than two bits, the sequence selection may be used on top of modulating the sequence with the control information. As an alternative, to transmit control information with a larger number of bits, additional UL symbols, for example, a larger number of REs may be allocated to carry the control information. For example, as shown in FIG. 6, three groups of symbols may be allocated to carry the control information 600, where a first group 610 of Symbols 0 and a third group 630 of Symbols 2 contain sequences modulated by the control information, while a second group 620 of Symbols 1 contains one or more un-modulated symbols as a reference signal. As an alternative to convey control information with a larger number of bits, such as larger than two, the terminal device 120 may apply higher order modulation on the control information when transmitting. For example, a single modulated sequence can convey up to 4 bits with 16-quadrature amplitude modulation (QAM). Of course, other number of bits for the control information and other types of modulation may also be applicable.

In some example embodiments, an indication of the association between the subsets of RA preambles and the predefined sequences may be configured at the terminal device 120, for example, by the network device 110, in a system information block (SIB). In some example embodiments, configuration information from the network device 110 may further include, for example, in the SIB, information to determine the location and number of resource units for transmission of the data information; the association between the sets of RA preambles in the resource units for transmission of RA preambles and the resource units for transmission of data information; and information about which part of resources (REs) is used for transmission of the control information and which part is used for transmission of the data information within a resource unit (such as a PUSCH occasion). The association between configurations of data information and values for different control information may also be configured by the network device 110, for example, in the SIB.

In some other example, if there is one resource unit available for transmission of a RA preamble, the association between the sets of RA preambles in the resource units for transmission of RA preambles and the resource units for transmission of data information may not be required and thus in selecting the RA preamble, the target resource unit to be used for transmission of the RA preamble is not required. In some example embodiments, the location of control information is determined by the set of preambles within a resource unit for transmission of a RA preamble.

Referring back to FIG. 4, in the process 400, the terminal device 120 transmits 420 the selected RA preamble, the modulated control information, and the data information in a RA message to the network device 110. The data information may be transmitted at least using the target resource unit. Depending on the size of the data information and the resource allocation, one or more additional resource units may be needed for its transmission. In addition, the modulated control information may also be transmitted using the target resource unit.

In some example embodiments, the terminal device 120 may transmit such RA message (such as MsgA) to initiate a two-step RA procedure. In some other example embodiments, other types of RA procedure which requires a combination of RA preamble and data information in a RA message may also be applicable. As mentioned below, although being considered as a RA message, the RA preamble is transmitted using different time and/or frequency resources from the control information and the data information.

Figure 7:
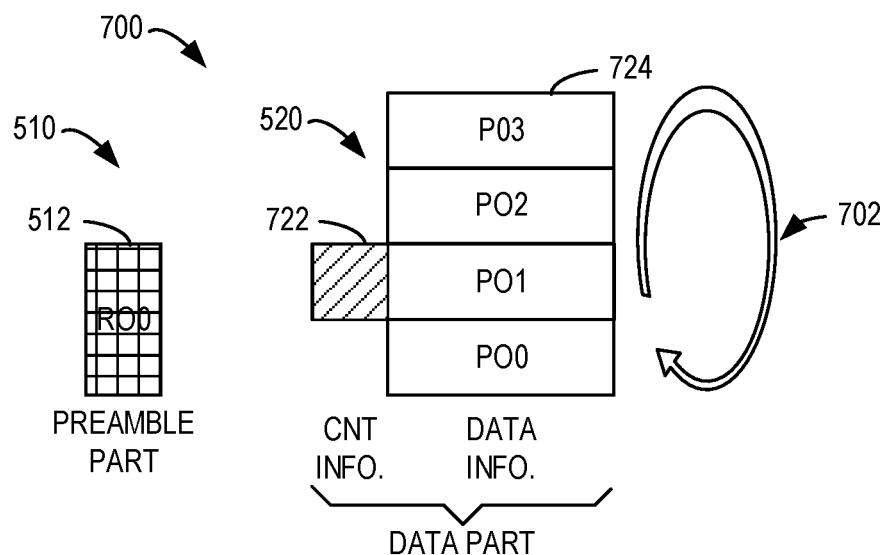
FIG. 7 illustrates a schematic diagram of a structure of a random access message to be transmitted according to some example embodiments of the present disclosure.

FIG. 7 illustrates an example of the RA message 700 transmitted by the terminal device 120 to the network device 110 according to the association illustrated in FIG. 5. Still using the example described with reference to Table 1, the terminal device 120 selects Preamble 7 and then selects Predefined Sequence 3 associated with this RA preamble in RO0 and PO1. As shown in FIG. 7, the RA message 502 includes Preamble 7 in the resource unit RO0 512 in the preamble part 510, the control information 722 related to Predefined Sequence 3 in the data part 520 using the resource unit PO1, and the data information 724 using four resource units PO0 to PO3.

In some example embodiments, if the number of resource units for transmitting the data information is larger than one, the terminal device 120 may map the data information to those resource units in a cyclic order started from the target resource unit. For example, the terminal device 120 may modulate and encode the data information to generate coded modulation symbols. The mapping order of the coded modulation symbols of the data information when it spans the plurality of resource units is such that it starts with the resource unit containing the control information (i.e., the target resource unit) and then cyclically mapped to other resource units.

In some example embodiments, in response to no enough resource units available before an end of resource allocation for the data information, the terminal device 120 may cyclically select one or more additional resources from a start of the resource allocation. As an example, it is supposed that there are eight resource units, represented by {A, B, C, D, E, F, G, H}, that are arranged in an ascending order of frequency. If the number of resource units used is 4, and the target resource unit is G, then according to the cyclic order, the used resource units are G, H, A, B.

In some example embodiments, in response to no enough resource units available before an end of resource allocation for the data information, the terminal device 120 may map the data information using at least one additional resource unit before the target resource unit to satisfy the number of resource units. Still taking the set of available resource {A, B, C, D, E, F, G, H} as example, if the number of resource units used is 4, and the target resource unit is G, by selecting additional resource unit(s), the used resource units are G, H, E, and F. The benefit of such cyclic is to have the resource units consecutive when it is beneficial to do so (e.g. for the DFT-s-OFDM waveform).

For example, as illustrated in FIG. 7, the control information 722 is transmitted using the target resource unit PO1. The data information 724 may be mapped to all the used resource units PO0 to PO4 in a cyclic order from PO1, PO2, PO3, and PO0, as indicated by the arrow 702. It is to be noted that an opposite cyclic order is also possible. The cyclic mapping order of the data information may further improve the decodability of data in the case where multiple terminal devices transmit autonomously in the same set of resources.

In some example embodiments, the network device 110 may determine allocation of resource units for transmission of the data information based on a location of the target resource unit and the number of resources units and allocate the resource units to the terminal device semi-statically.

At the side of the network device 110, it may detect and decode the RA message on all the possible resource units. The operation of the network device 110 in detection and decoding the RA message may be regarded as an inverse process to that performed at the terminal device 120. Specifically, the network device 110 detects 425 one of a plurality of RA preambles that is received from the terminal device 120. The plurality of RA includes all the possible RA preambles that are potentially used by the terminal device 120. The network device 110 may perform bind detection to decode the RA preamble selected and transmitted by the terminal device 120.

The network device 110 determines 430 at least one predefined sequence associated with the detected random access preamble based on the predetermined association between a plurality of predefined sequences and the plurality of subsets of random access preambles and a target resource unit to be used for transmission of control information and data information from the terminal device. The network device 110 then detects 435 the control information on the target resource unit based on the at least one predefined sequence. In some examples, the network device 110 may perform demodulation using the determined predefined sequence(s). Upon detecting the control information, the network device 110 detects 440 the data information based on the control information. The detection of the data information may be performed on at least a target resource unit that is corresponding to the predefined sequence, which is associated with the control information.

In some example embodiments, the network device 110 may transmit 445 a response to the RA message. The response may include a random access response and a contention resolution. Such response may also be referred to as MsgB in the two-step RA procedure. It would be appreciated that the response may include other information in other types of RA procedures.

In some example embodiments, in detecting the data information, if the network device 110 determines that the control information indicates the number of resource units used for transmitting the data information and the number is larger than one, it may de-map the data information from the number of resource units in a cyclic order started from the target resource unit.

Some example embodiments of information transmission in RA have been described above. By transmitting the control information in the RA message to the example embodiments, it is possible to improve the reliability of the control information and reduce the probability of collision of control information in the case of multiple RA preamble point to the same resource unit.

Figure 8:
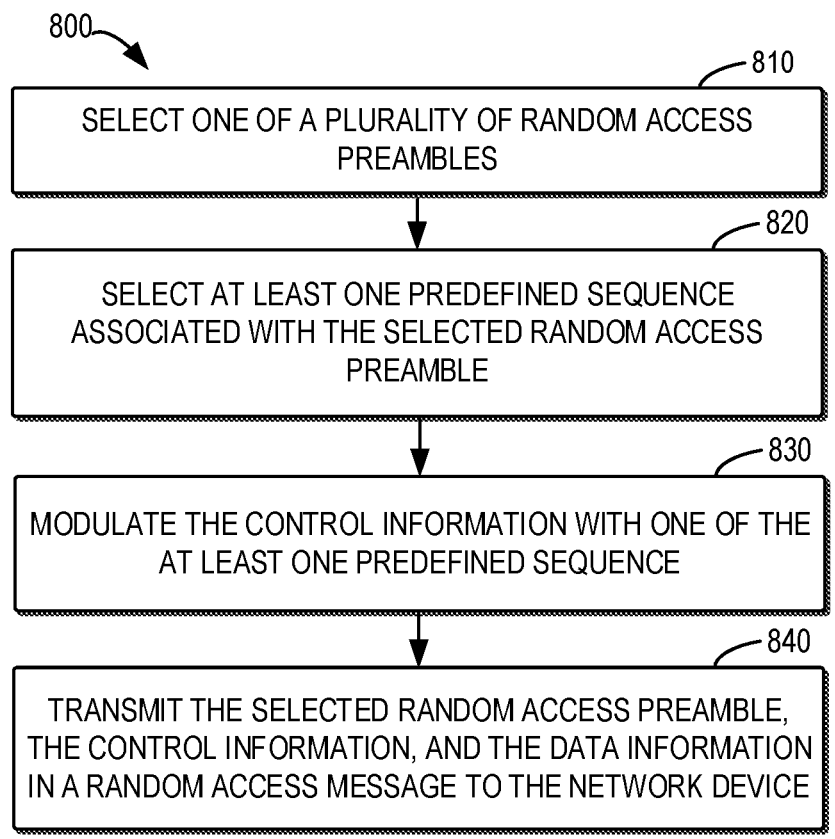
FIG. 8 illustrates a flowchart of an example method implemented at a terminal device according to some example embodiments of the present disclosure.

FIG. 8 shows a flowchart of an example method 800 implemented at a terminal device according to some example embodiments of the present disclosure. For the purpose of discussion, the method 800 will be described from the perspective of the terminal device 120 with reference to FIG. 1.

At block 810, the terminal device 120 selects, at a terminal device, one of a plurality of random access preambles, the plurality of random access preambles being divided into a plurality of subsets of random access preambles. At block 820, the terminal device 120 selects at least one predefined sequence associated with the selected random access preamble based on a predetermined association between a plurality of predefined sequences and the plurality of subsets of random access preambles and based on a target resource unit to be used for transmission of control information and data information. At block 830, the terminal device 120 modulates the control information with one of the at least one predefined sequence, the control information indicating configuration of the data information. At block 840, the terminal device 120 transmits the selected random access preamble, the modulated control information, and the data information in a random access message to the network device, the data information being transmitted using at least the target resource unit.

In some example embodiments, the plurality of predefined sequences are orthogonal or quasi-orthogonal to each other.

In some example embodiments, the transmitting comprises: in response to the number of resource units for transmitting the data information being larger than one, mapping the data information to the number of resource units in a cyclic order started from the target resource unit; and transmitting the data information using the number of resource units.

In some example embodiments, the method further comprises receiving, from the network device, allocation of resource units for transmission of the data information based on a location of the target resource unit and the number of resources units.

In some example embodiments, mapping the data information comprises: in response to no enough resource units available before an end of resource allocation for the data information, mapping the data information using at least one additional resource unit before the target resource unit to satisfy the number of resource units.

In some example embodiments, the control information indicates at least one of a size of the data information, the number of resource units used for transmitting the data information, or a modulation coding scheme used for the data information.

In some example embodiments, selecting the at least one predefined sequence comprises selecting a location of a further target resource unit to be used for transmission of the selected random access preamble; and selecting the at least one predefined sequence based on the predetermined association that is related to the location of the further target resource unit to be used for transmission of the selected random access preamble.

In some example embodiments, the control information and control resource elements carrying the control information are of predetermined sizes, and wherein the data information is of a variable size.

In some example embodiments, the plurality of random access preambles comprise a plurality of sets of random access preambles each associated with a resource unit available for transmission of the control information and the data information, each of plurality of sets of random access preambles being divided into some of the plurality of subsets of random access preambles, and wherein the method further comprises:

determining the target resource unit based on the set of random access preamble from which the random access preamble is selected.

In some example embodiments, the method 800 further comprises receiving an indication of the predetermined association from the network device.

Figure 9:
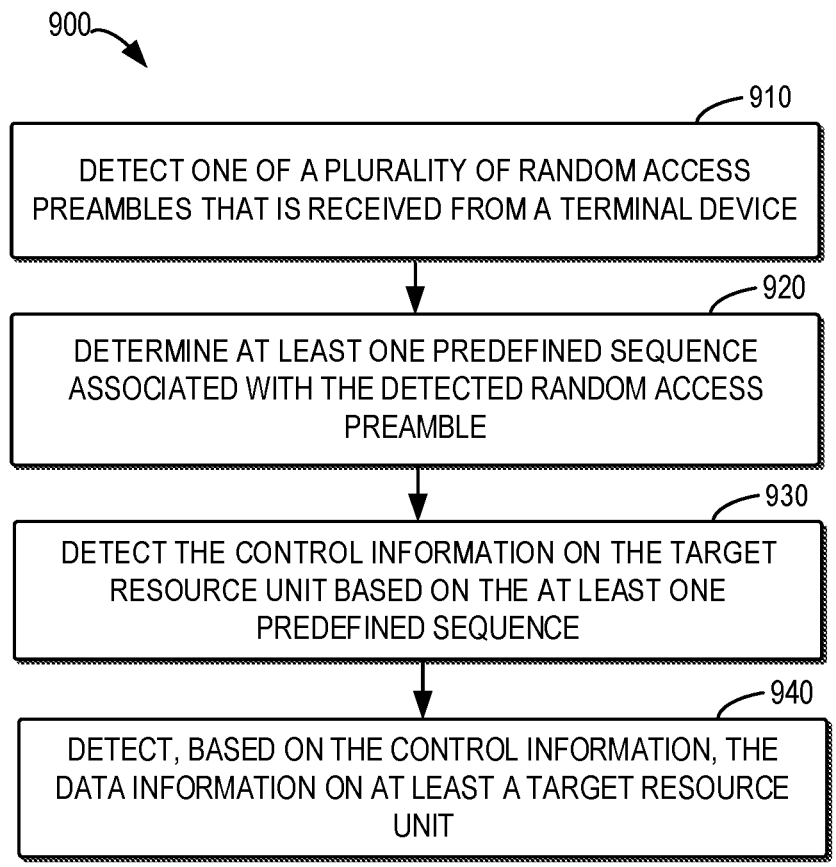
FIG. 9 illustrates a flowchart of an example method implemented at a network device according to some example embodiments of the present disclosure.

FIG. 9 shows a flowchart of an example method 900 implemented at a network device according to some example embodiments of the present disclosure. For the purpose of discussion, the method 900 will be described from the perspective of the network device 110 with reference to FIG. 1.

At block 910, the network device 110 detects, at a network device, one of a plurality of random access preambles that is received from a terminal device, the plurality of preambles being divided into a plurality of subsets of random access preambles. At block 920, the network device 110 determines at least one predefined sequence associated with the detected random access preamble based on a predetermined association between a plurality of predefined sequences and the plurality of subsets of random access preambles and based on a target resource unit to be used for transmission of control information and data information from the terminal device. At block 930, the network device 110 detects the control information on the target resource unit based on the at least one predefined sequence, the control information indicating a configuration of the data information. At block 940, the network device 110 detects, based on the control information, the data information on at least a target resource unit.

In some example embodiments, the plurality of predefined sequences are orthogonal or quasi-orthogonal to each other.

In some example embodiments, detecting the data information comprises: in response to the control information indicating the number of resource units used for transmitting the data information and the number being larger than one, de-mapping the data information from the number of resource units in a cyclic order started from the target resource unit.

In some example embodiments, the control information indicates at least one of a size of the data information, the number of resource units used for transmitting the data information, or a modulation coding scheme used for the data information.

In some example embodiments, the control information and resource elements carrying the control information are of predetermined sizes, and the data information is of a variable size.

In some example embodiments, the plurality of random access preambles comprise a plurality of sets of random access preambles each associated with a resource unit available for transmission of the control information and the data information, each of plurality of sets of random access preambles being divided into some of the plurality of subsets of random access preambles.

In some example embodiments, the method 900 further comprises transmitting an indication of the predetermined association to the terminal device.

In some example embodiments, an apparatus capable of performing any of the method 800 (for example, the terminal device 120) may comprise means for performing the respective steps of the method 800. The means may be implemented in any suitable form. For example, the means may be implemented in a circuitry or software module.

In some example embodiments, the apparatus comprises: means for selecting, at a terminal device, one of a plurality of random access preambles, the plurality of random access preambles being divided into a plurality of subsets of random access preambles; means for selecting at least one predefined sequence associated with the selected random access preamble based on a predetermined association between a plurality of predefined sequences and the plurality of subsets of random access preambles and based on a target resource unit to be used for transmission of control information and data information; means for modulating the control information with one of the at least one predefined sequence, the control information indicating configuration of the data information; and means for transmitting the selected random access preamble, the modulated control information, and the data information in a random access message to the network device, the data information being transmitted using at least the target resource unit.

In some example embodiments, the plurality of predefined sequences are orthogonal or quasi-orthogonal to each other.

In some example embodiments, the means for transmitting comprises: means for in response to the number of resource units for transmitting the data information being larger than one, mapping the data information to the number of resource units in a cyclic order started from the target resource unit; and transmitting the data information using the number of resource units.

In some example embodiments, the apparatus further comprises: means for receiving, from the network device, allocation of resource units for transmission of the data information based on a location of the target resource unit and the number of resources units.

In some example embodiments, means for mapping the data information comprises: means for in response to no enough resource units available before an end of resource allocation for the data information, mapping the data information using at least one additional resource unit before the target resource unit to satisfy the number of resource units.

In some example embodiments, the control information indicates at least one of a size of the data information, the number of resource units used for transmitting the data information, or a modulation coding scheme used for the data information.

In some example embodiments, means for selecting the at least one predefined sequence comprises: means for selecting a location of a further target resource unit to be used for transmission of the selected random access preamble; and means for selecting the at least one predefined sequence based on the predetermined association that is related to the location of the further target resource unit to be used for transmission of the selected random access preamble.

In some example embodiments, the control information and control resource elements carrying the control information are of predetermined sizes, and the data information is of a variable size.

In some example embodiments, the plurality of random access preambles comprise a plurality of sets of random access preambles each associated with a resource unit available for transmission of the control information and the data information, each of plurality of sets of random access preambles being divided into some of the plurality of subsets of random access preambles, and wherein the method further comprises: determining the target resource unit based on the set of random access preamble from which the random access preamble is selected.

In some example embodiments, the apparatus further comprises means for receiving an indication of the predetermined association from the network device.

In some example embodiments, the means in the apparatus comprises at least one processor; and at least one memory including computer program code, the at least one memory and computer program code configured to, with the at least one processor, cause the performance of the apparatus.

In some example embodiments, an apparatus capable of performing any of the method 900 (for example, the network device 110) may comprise means for performing the respective steps of the method 900. The means may be implemented in any suitable form. For example, the means may be implemented in a circuitry or software module.

In some example embodiments, the apparatus comprises: means for detecting, at a network device, one of a plurality of random access preambles that is received from a terminal device, the plurality of preambles being divided into a plurality of subsets of random access preambles, and a subset of random access preambles being associated with one of a plurality of predefined sequences; means for determining at least one predefined sequence associated with the detected random access preamble based on a predetermined association between a plurality of predefined sequences and the plurality of subsets of random access preambles and based on a target resource unit to be used for transmission of control information and data information from the terminal device; means for detecting the control information on the target resource unit based on the at least one predefined sequence, the control information indicating a configuration of the data information; and means for detecting, based on the control information, the data information on a target resource unit corresponding to the predefined sequence associated with the control information.

In some example embodiments, the plurality of predefined sequences are orthogonal or quasi-orthogonal to each other.

In some example embodiments, the means for detecting the data information comprises: means for in response to the control information indicating the number of resource units used for transmitting the data information and the number being larger than one, de-mapping the data information from the number of resource units in a cyclic order started from the target resource unit.

In some example embodiments, the control information indicates at least one of a size of the data information, the number of resource units used for transmitting the data information, or a modulation coding scheme used for the data information.

In some example embodiments, the control information and resource elements carrying the control information are of predetermined sizes, and the data information is of a variable size.

In some example embodiments, the plurality of random access preambles comprise a plurality of sets of random access preambles each associated with a resource unit available for transmission of the control information and the data information, each of plurality of sets of random access preambles being divided into some of the plurality of subsets of random access preambles.

In some example embodiments, the apparatus further comprises means for transmitting an indication of the predetermined association to the terminal device.

In some example embodiments, the means in the apparatus comprises at least one processor; and at least one memory including computer program code, the at least one memory and computer program code configured to, with the at least one processor, cause the performance of the apparatus.

Figure 10:
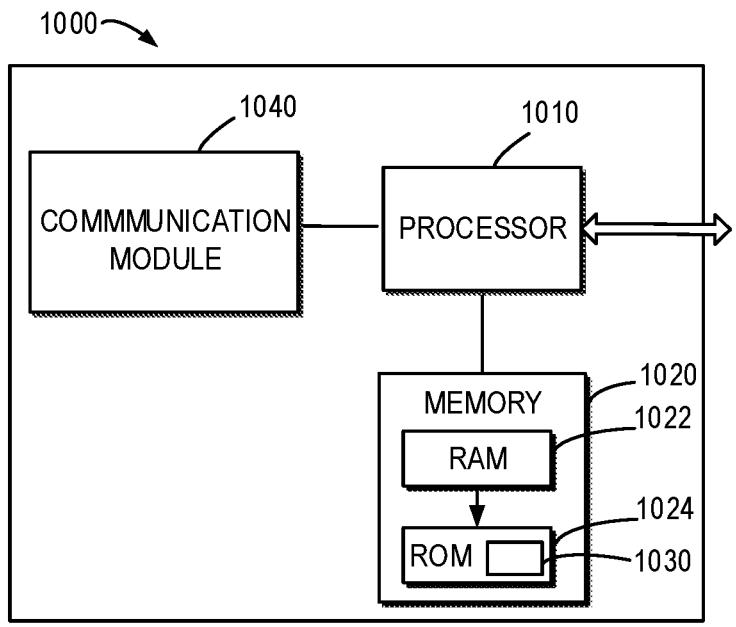
FIG. 10 illustrates a simplified block diagram of a device that is suitable for implementing example embodiments of the present disclosure.

FIG. 10 is a simplified block diagram of a device 1000 that is suitable for implementing embodiments of the present disclosure. The device 1000 may be provided to implement a communication device, for example the terminal device 120 or the network device 110 as shown in FIG. 1. As shown, the device 1000 includes one or more processors 1010, one or more memories 1020 coupled to the processor 1010, and one or more communication modules 1040 coupled to the processor 1010.

The communication module 1040 is for bidirectional communications. The communication module 1040 has at least one antenna to facilitate communication. The communication interface may represent any interface that is necessary for communication with other network elements.

The processor 1010 may be of any type suitable to the local technical network and may include one or more of the following: general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

The memory 1020 may include one or more non-volatile memories and one or more volatile memories. Examples of the non-volatile memories include, but are not limited to, a Read Only Memory (ROM) 1024, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1022 and other volatile memories that will not last in the power-down duration.

A computer program 1030 includes computer executable instructions that are executed by the associated processor 1010. The program 1030 may be stored in the ROM 1020. The processor 1010 may perform any suitable actions and processing by loading the program 1030 into the RAM 1020.

The example embodiments of the present disclosure may be implemented by means of the program 1030 so that the device 1000 may perform any method/process of the present disclosure as discussed with reference to FIG. 3A to FIG. 8. The example embodiments of the present disclosure may also be implemented by hardware or by a combination of software and hardware.

Figure 11:
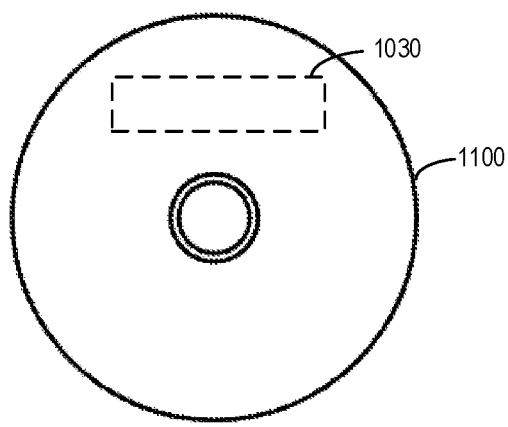
FIG. 11 illustrates a block diagram of an example computer readable medium according to some example embodiments of the present disclosure.

In some example embodiments, the program 1030 may be tangibly contained in a computer readable medium which may be included in the device 1000 (such as in the memory 1020) or other storage devices that are accessible by the device 1000. The device 1000 may load the program 1030 from the computer readable medium to the RAM 1022 for execution. The computer readable medium may include any types of tangible non-volatile storage, such as ROM, EPROM, a flash memory, a hard disk, CD, DVD, and the like. FIG. 11 shows an example of the computer readable medium 1100 in form of CD or DVD. The computer readable medium has the program 1030 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above with reference to FIG. 3A to FIG. 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus, comprising:
   at least one processor; and
   at least one memory including computer program code;
   the at least one memory and the computer program code are configured to, with the at least one processor, cause the apparatus to:
   select, at a terminal device, one of a plurality of random access preambles, the plurality of random access preambles being divided into a plurality of subsets of random access preambles;
   select at least one predefined sequence associated with the selected random access preamble based on a predetermined association between a plurality of predefined sequences and the plurality of subsets of random access preambles and based on a target resource unit to be used for transmission of control information and data information of variable size, wherein the control information indicates a number of resource units for transmitting the data information;

modulate the control information with one of the at least one predefined sequence, the control information indicating configuration of the data information;

in response to the number of resource units, indicated by the control information, for transmitting the data information being larger than one, map the data information to the number of resource units, of a series of repeating resource units, in a cyclic order starting from the target resource unit, and when mapping of the data information to the number of the resource units reaches a last resource unit of the series of repeating resource units before mapping of the data information is completed, the mapping of the data information continues in the cyclic order to a first resource unit of the series of repeating resource units; and transmit the selected random access preamble, the control information, and the data information in a random access message to a network device, the data information being transmitted using the number of resource units.

2. The apparatus of claim 1, wherein the plurality of predefined sequences are orthogonal or quasi-orthogonal to each other.

3. The apparatus of claim 1, wherein the at least one processor and the computer program code are configured to further cause the apparatus to:

receive, from the network device, allocation of resource units for transmission of the data information based on a location of the target resource unit and the number of resources units.

4. The apparatus of claim 1, wherein the at least one processor and the computer program code are configured to cause the apparatus to:

if there are not enough resource units for transmission of the data information, map the data information to at least one additional resource unit to satisfy the number of resource units.

5. The apparatus of claim 1, wherein the at least one processor and the computer program code are configured to cause the apparatus to:

modulate the control information with the selected predefined sequence; and transmit the modulated control information.

6. The apparatus of claim 1, wherein the control information indicates at least one of a size of the data information, or a modulation coding scheme used for the data information.

7. The apparatus of claim 1, wherein the at least one processor and the computer program code are configured to cause the apparatus to:

determine a location of a further target resource unit to be used for transmission of the selected random access preamble; and select the at least one predefined sequence based on the predetermined association that is related to the location of the further target resource unit to be used for transmission of the selected random access preamble.

8. The apparatus of claim 1, wherein the control information and resource elements carrying the control information are of predetermined sizes, and wherein the data information is of a variable size.

9. The apparatus of claim 1, wherein the plurality of random access preambles comprise a plurality of sets of random access preambles each associated with a resource unit available for transmission of the control information and the data information, and wherein the at least one processor and the computer program code are configured to further cause the apparatus to:

determine the target resource unit based on the set of random access preambles from which the random access preamble is selected.

10. The apparatus of claim 1, wherein the at least one processor and the computer program code are configured to further cause the apparatus to:

receive an indication of the predetermined association from the network device.

11. An apparatus, comprising:

at least one processor; and at least one memory including computer program code;

the at least one memory and the computer program code are configured to, with the at least one processor, cause the apparatus to:

detect, at a network device, one of a plurality of random access preambles that is received from a terminal device, the plurality of preambles being divided into a plurality of subsets of random access preambles;

determine at least one predefined sequence associated with the detected random access preamble based on a predetermined association between a plurality of predefined sequences and the plurality of subsets of random access preambles and based on a target resource unit to be used for transmission of control information and data information of variable size from the terminal device, wherein the control information indicates a number of resource units for the data information;

detect the control information on the target resource unit based on the at least one predefined sequence, the control information indicating a configuration of the data information;

detect, based on the control information, the data information on the number of resource units; and in response to the control information indicating the number of resource units and the number being larger than one, determine the data information from the number of resource units, of a series of repeating resource units, in a cyclic order starting from the target resource unit until reaching a last resource unit of the series of repeating resource, and then continuing in the cyclic order to a first resource unit of the series of repeating resource units to determine the data information.

12. The apparatus of claim 11, wherein the plurality of predefined sequences are orthogonal or quasi-orthogonal to each other.

13. The apparatus of claim 11, wherein the control information indicates at least one of a size of the data information, or a modulation coding scheme used for the data information.

14. The apparatus of claim 11, wherein the control information and resource elements carrying the control information are of predetermined sizes.

15. The apparatus of claim 11, wherein the plurality of random access preambles comprise a plurality of sets of random access preambles each associated with a resource unit available for transmission of the control information and the data information.

16. A method, comprising:
    selecting, at a terminal device, one of a plurality of random access preambles, the plurality of random access preambles being divided into a plurality of subsets of random access preambles;
    selecting at least one predefined sequence associated with the selected random access preamble based on a predetermined association between a plurality of predefined sequences and the plurality of subsets of random access preambles and based on a target resource unit to be used for transmission of control information and data information of variable size, wherein the control information indicates a number of resource units for transmitting the data information;
    modulating the control information with one of the at least one predefined sequence, the control information indicating configuration of the data information;
    in response to the number of resource units, indicated by the control information, for transmitting the data information being larger than one, mapping the data information to the number of resource units, of a series of repeating resource units, in a cyclic order starting from the target resource unit, and when mapping of the data information to the number of the resource units reaches a last resource unit of the series of repeating resource units before mapping of the data information is completed, the mapping of the data information continues in the cyclic order to a first resource unit of the series of repeating resource units; and
    transmitting the selected random access preamble, the control information, and the data information in a random access message to a network device, the data information being transmitted using the number of resource units.

17. The method of claim 16, further comprising:
    receiving, from the network device, allocation of resource units for transmission of the data information based on a location of the target resource unit and the number of resource units.

* * * * *